(12) United States Patent
Brewer et al.

(10) Patent No.: US 6,481,194 B1
(45) Date of Patent: Nov. 19, 2002

(54) CUTTING IMPLEMENT HEIGHT ADJUSTMENT MECHANISM HAVING GROUPED HEIGHT SELECTIONS

(75) Inventors: Clay David Brewer, Willow Springs, NC (US); Eric Charles Wobig, Madison, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/577,303

(22) Filed: May 24, 2000

(51) Int. Cl.[7] .......................... A01D 34/03; A01D 34/43; A01D 34/64
(52) U.S. Cl. .......................................... 56/17.2; 56/15.8
(58) Field of Search ................................ 56/17.2, 15.5, 56/15.8, DIG. 22, 15.9, 12.7, DIG. 3, DIG. 10

(56) References Cited

U.S. PATENT DOCUMENTS

| | | |
|---|---|---|
| 1,676,088 A | 7/1928 | Holmes |
| 2,862,343 A * | 12/1958 | Wood ........................ 56/15.3 |
| 3,550,364 A * | 12/1970 | Musgrave ................... 56/15.8 |
| 3,657,866 A * | 4/1972 | Burroughs .................. 56/15.5 |
| 3,706,188 A * | 12/1972 | Quiram ....................... 56/11.6 |
| 4,106,272 A | 8/1978 | Peterson et al. ............ 56/202 |
| 4,195,860 A * | 4/1980 | Helams ..................... 172/451 |
| 4,310,997 A * | 1/1982 | Streicher ................... 56/15.9 |
| 4,313,295 A * | 2/1982 | Hansen et al. ............. 56/15.8 |
| 4,320,616 A * | 3/1982 | Marto ........................ 56/15.3 |
| 4,325,211 A * | 4/1982 | Witt et al. .................. 56/15.5 |
| 4,441,306 A | 4/1984 | Kuhn ......................... 56/15.9 |
| 4,664,405 A | 5/1987 | Bedis ..................... 280/490 A |
| 4,715,168 A | 12/1987 | Oxley ........................ 56/15.8 |
| 4,840,020 A | 6/1989 | Oka ........................... 56/15.2 |
| 5,136,829 A | 8/1992 | Sebben et al. .............. 56/17.2 |
| 5,251,429 A * | 10/1993 | Minato et al. .............. 56/17.2 |
| 5,355,665 A * | 10/1994 | Peter ......................... 56/15.8 |
| 5,526,633 A | 6/1996 | Strong et al. ............... 56/17.2 |
| 5,715,667 A | 2/1998 | Goman et al. .............. 56/13.6 |
| 5,749,209 A * | 5/1998 | Thomason .................. 56/17.2 |
| 5,778,646 A | 7/1998 | Pfisterer .................... 56/16.4 |
| 5,797,252 A | 8/1998 | Goman ....................... 56/17.2 |
| 5,836,144 A | 11/1998 | Hohnl et al. ............... 56/320.1 |
| 5,845,471 A | 12/1998 | Seegert et al. ............. 56/17.2 |
| 5,848,520 A | 12/1998 | Arfstrom et al. ........... 56/11.4 |
| 5,937,625 A | 8/1999 | Seegert ...................... 56/15.6 |
| 6,012,274 A * | 1/2000 | Eavenson et al. .......... 56/17.2 |
| 6,038,841 A | 3/2000 | Bates, Jr. et al. ........... 56/15.8 |

FOREIGN PATENT DOCUMENTS

| | | |
|---|---|---|
| EP | 0 245 824 A | 11/1987 |
| JP | 09 098631 A | 4/1997 |

OTHER PUBLICATIONS

The Toro Company, Toro ProLine Commercial Lawn–Care Equipment That Means Business, of pp. 1–20, see particularly pp. 5–6, 9–10, date of publication 1994, published in U.S.A.

(List continued on next page.)

*Primary Examiner*—Robert E. Pezzuto
*Assistant Examiner*—Árpád Fábián Kovács

(57) ABSTRACT

A cut height adjustment mechanism is provided for use with a vegetation cutting device, such as a tractor, and including a front-mounted cutting deck. To achieve height adjustment of a front portion of the intended deck, there is provided a height positioning arm fitted and secured between a bracket and a mounting structure adapted to attach to the deck of the cutting device. Adjustment of the arm and hence, the front of the deck, is accomplished by securing the arm to a selection of perforations occurring in both the bracket and the mounting structure. Rear adjustment of the deck is accomplished by connection of a drive member to a vertical upstanding portion also having perforations and attached to the deck. To allow a user to visually inspect which range of cut height has been selected, perforations are provided both in the bracket and the mounting structure, each corresponding similarly to each other to designate a particular range of cut height. Further, the adjustment mechanism permits the user to obtain a lower profile of cut than is currently permitted, thus enabling cutting to occur under low hanging vegetation and shrubbery.

36 Claims, 7 Drawing Sheets

OTHER PUBLICATIONS

Grillo, Linea Garden by Grillo, Bee, Fly, of pp. 1–8, see particularly pp. 1–4, date of publication unknown, published in Italy, no date.

The Toro Company, Landscape Contractor Equipment, of pp. 1–17, see particularly pp. 4, 6, 8, 11, 12, date of publication 1996, published in U.S.A.

The Toro Company, Groundsmaster 345, of pp. 1–4, see all, date of publication 1989, published in U.S.A.

John Deere, Commercial Walk Behind Mowers, of pp. 1–8, see particularly pp. 2, 6, date of publication 1997, published in U.S.A.

The Toro Company, Groundsmaster 217–D and Groundsmaster 220, of pp. 1–8, see particularly pp. 4, 5, date of publication 1985, published in U.S.A.

BEFCO, Inc., BEFCO Finishing Mowers Cyclone, of pp. 1–4, see all, date of publication Jul. 1987, published in U.S.A.

Deines Manufacturing, Commercial Mowers, of pp. 1–4, see all, date of publication unknown, published in U.S.A., no date.

Gianni Ferrari, Turbograss, of pp. 1–6, see particulary p. 1, date of publication unknown, published in Italy, no date.

Brown Manufacturing Corporation, Rotary Cutter, of pp. 1–2, see particularly p. 1, date of publication unknown, published in U.S.A.

The Toro Company, Landscape Contractor Equipment, of pp. 1–20, see particularly pp. 1, 3, 4, 6, 10, date of publication 1997, published in U.S.A.

SCAG Power Equipment, Simply the Best, of pp. 1–16, see particularly pp. 2, 3, 4, 5, date of publication 1992, published in U.S.A.

Hustler, Excel Industries, Inc., Out Hustle All the Rest, of pp. 1–12, see particulary pp. 3, 5, 9, date of publication unknown, published in U.S.A., no date.

Deines Corporation, Deines Model 1850–T, of pp. 1–2, see particularly p. 1, date of publication unknown, published in U.S.A., no date.

Ford New Holland, Inc., Commercial Front Mowers CM224, CM274, of pp. 1–12, see particularly p. 8, publication date 1990, published in U.S.A.

Yamaha, Lawn Tractors YT3600/YT5700/YT6700/YT6800, of pp. 1–8, see particularly p. 4, publication date 1990, published in U.S.A.

The Toro Company, Proline 118 Riding Mower, of pp. 1–8, see particularly pp. 2, 3, publication date 1991, published in U.S.A.

Yazoo Manufacturing Company, Yazoo Eagle I, of pp. 1–4, see particularly p. 1, date of publication unknown, published in U.S.A., no date.

DEINES Corporation, Introducing D184OT–3, see p. 1 of 1, date of publication unknown, published in U.S.A.

Mott Corporation, Mott Hammer—Knife, of pp. 1–4, see all, date of publication unknown, published in U.S.A., no date.

Bolens, Bolens Division, FMC Corporation, Bolens America's Finest Outdoor Power Equipment, of pp. 1–28, see particularly p. 1, publication date 1964, published in U.S.A.

Jacobsen Division of Textron, Inc., HR–9016 TURBO Wide–Area Rotary Mower, of pp. 1–2, see particularly p. 1, publication date 1998, published in U.S.A.

* cited by examiner

CUTTING IMPLEMENT HEIGHT ADJUSTMENT MECHANISM HAVING GROUPED HEIGHT SELECTIONS

FIELD OF THE INVENTION

The current invention relates to height adjustable cutting decks, and more specifically, to structure for adjusting the height of a front-mounted deck above ground level.

BACKGROUND OF THE INVENTION

Typical vegetation cutting implements such as front mounted cutting decks are supported for travel over the ground on gauge wheels that control the height of the deck above the ground; and accordingly, the height of the blade carried by the deck. These height gauge wheels are commonly mounted at the ends of positioning arms which are, in turn, adjustably connected with the deck. At least three different techniques are employed to adjust the cutting height by adjusting the relative positions of the gauge wheel positioning arm with respect to the deck. Each accomplishes this through utilizing a pair of spaced apart mountings attached with the deck and to which the gauge wheel arm is adjustably secured. A first technique includes the provision of spaced apart and aligned posts mounted on a top surface of the deck. Each post includes vertically spaced perforations corresponding to a particular cut height. Also, these posts are releasably secured to the gauge wheel arm to vary the height of the cutting deck. A second technique utilizes spaced apart mounting brackets secured to the deck with spaced perforations corresponding to individual cut heights. These brackets receive pins as do corresponding brackets carried by the arm to vary the height of the cutting deck. Both the first and second techniques utilize a bolt or other pinning device passed through the perforations to select a particular cut height. Yet a third technique of adjusting the height of the deck utilizes a pair of gauge wheel arms fixed above the deck with the positioning of the gauge wheels being adjustable with respect to the arms. These gauge wheels are supported on lubricated spindles carried on the ends of each arm with a number of washers being provided along the length of the wheel spindle to change the positioning of the gauge wheel with respect to the arm, and hence, the deck above the ground.

All three of the above adjustment techniques, however, share at least two common disadvantages. The first disadvantage stems from the difficulty in maneuvering the cutting deck beneath low hanging vegetation and shrubbery. Maneuverability is inhibited because of a lack of vertical clearance between the vegetation, etc., and the structures inter-connecting the deck with the gauge wheel and/or its support arms. Respecting those decks which use gauge wheel arms which are fixed above the deck, the arms sometimes project above the deck providing a profile which is not low enough to easily operate the cutting deck under low hanging vegetation. Further, with those decks utilizing a spindle to adjust the gauge wheel arms, there frequently occurs interference between the spindle and low hanging shrubbery. Not only do these three techniques described above require significant time and effort to reset the deck to a different cutting height, but it can also be difficult to determine the exact range of cutting height associated with a particular setting. A second disadvantage comes at the cost of additional time spent in having to use another device such as a push mower to cut vegetation not reached by the attached cutting deck.

Also, when using washers to adjust the heighth of the cutting deck above ground level, further inconveniences arises. These inconveniences relate to their loss as well as an inability to avoid encountering grease upon placement on or removal from the lubricated spindles. Accordingly, all of the drawbacks mentioned inevitably result in an unwanted expenditure of time, effort, and money.

Thus, there exists a need to provide a means to adjust the gauge wheel positioning arm to quickly and easily change the cutting height of the deck while still allowing the user to maneuver the deck underneath low hanging vegetation and shrubbery.

SUMMARY OF THE INVENTION

To overcome the difficulties associated with the above techniques, there is provided an adjustable gauge wheel support structure attachable to a top surface of a cutting deck for positioning the deck at a certain distance above the ground. The structure is designed with a profile low enough to allow a user to operate the deck beneath low hanging vegetation and shrubbery. Additionally, the structure permits the deck to be quickly and easily adjusted to a desired cut height, while assuring the accuracy of that setting.

On the top surface of the deck, there is provided both a pivotal support bracket and a mounting means spaced from the support bracket. Positioned between the bracket and mounting means is a height positioning arm. At one end, the arm is arranged for pivotal movement within an inner channel of the bracket. Aligned with the bracket, the mounting means receives the arm at a mid-portion thereof to complete the mounting of the arm. At a second end, the arm carries a gauge wheel for contacting the surface of the ground. When connected to both the bracket and mounting means, the arm may be located within an inner channel of each such that a top surface of the bracket and mounting means lie substantially at or below a top surface of the arm. Limiting the upper surfaces of the support structure in this manner enables the structure to maintain a low profile reducing the likelihood of its snagging on low hanging shrubbery or other vegetation.

An adjustment means is included within each of the bracket and mounting means allowing an accurate adjustment of the deck to occur both quickly and easily. Within the bracket, there is constructed a plurality of openings designating varying levels of cut height. Likewise, the mounting means includes a plurality of openings arranged in groupings corresponding similarly to those designations made available in the bracket. Cooperating together, the openings in both the bracket and mounting means permit adjustment and securement of the height positioning arm within three (3) separate ranges of cut height. In a preferred embodiment, six different cut heights exist in each range from which a user may select when positioning the deck. Recognizing that a user may desire to avoid the need to completely re-adjust the arm at both the bracket and mounting means, overlap of particular cut height options among the groupings in the mounting means is provided. This availability allows the user to retain the current setting in the bracket and select corresponding and particular cut heights from among the three separate ranges constructed in the mounting means. Accordingly, a user can obtain an accurate height adjustment of a cutting deck to which this gauge wheel support structure is attached.

DESCRIPTION OF THE PREFERRED EMBODIMENT

Figure 1:
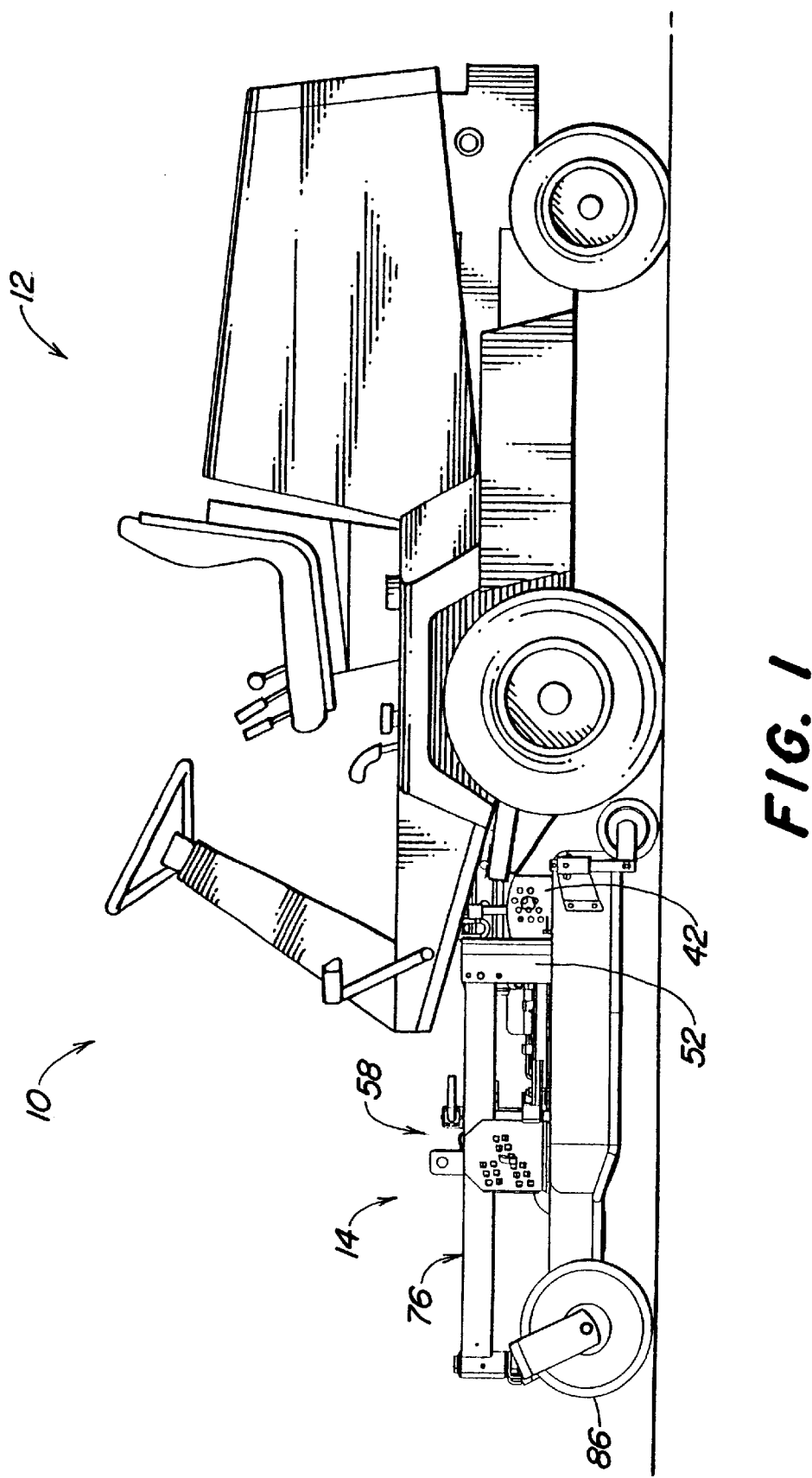
FIG. 1 is a side view of a tractor and a front-mounted cutting deck.
Figure 2:
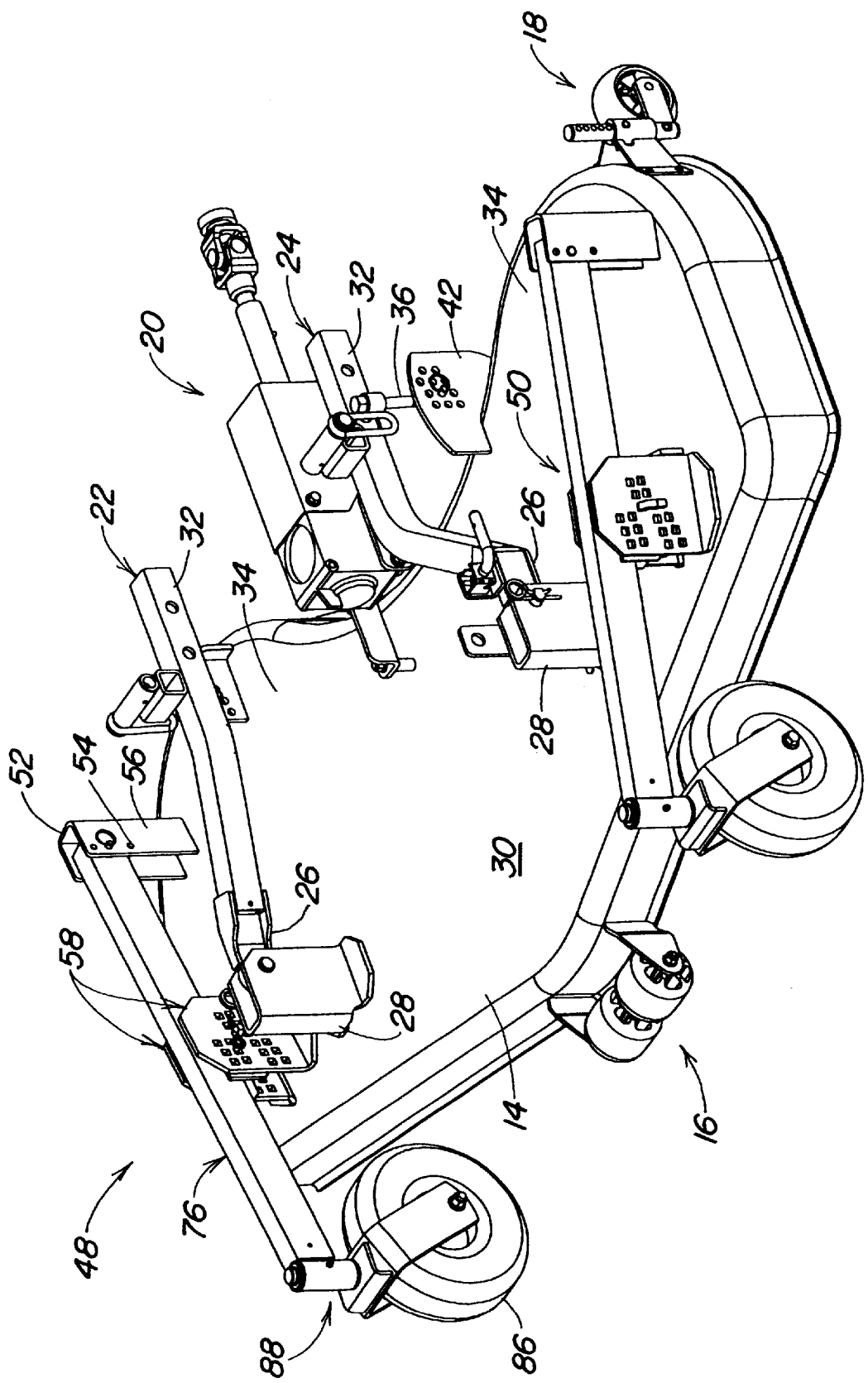
FIG. 2 is a front-elevated perspective view of the front-mounted cutting deck and illustrating both left and right adjustment means.
Figure 3:
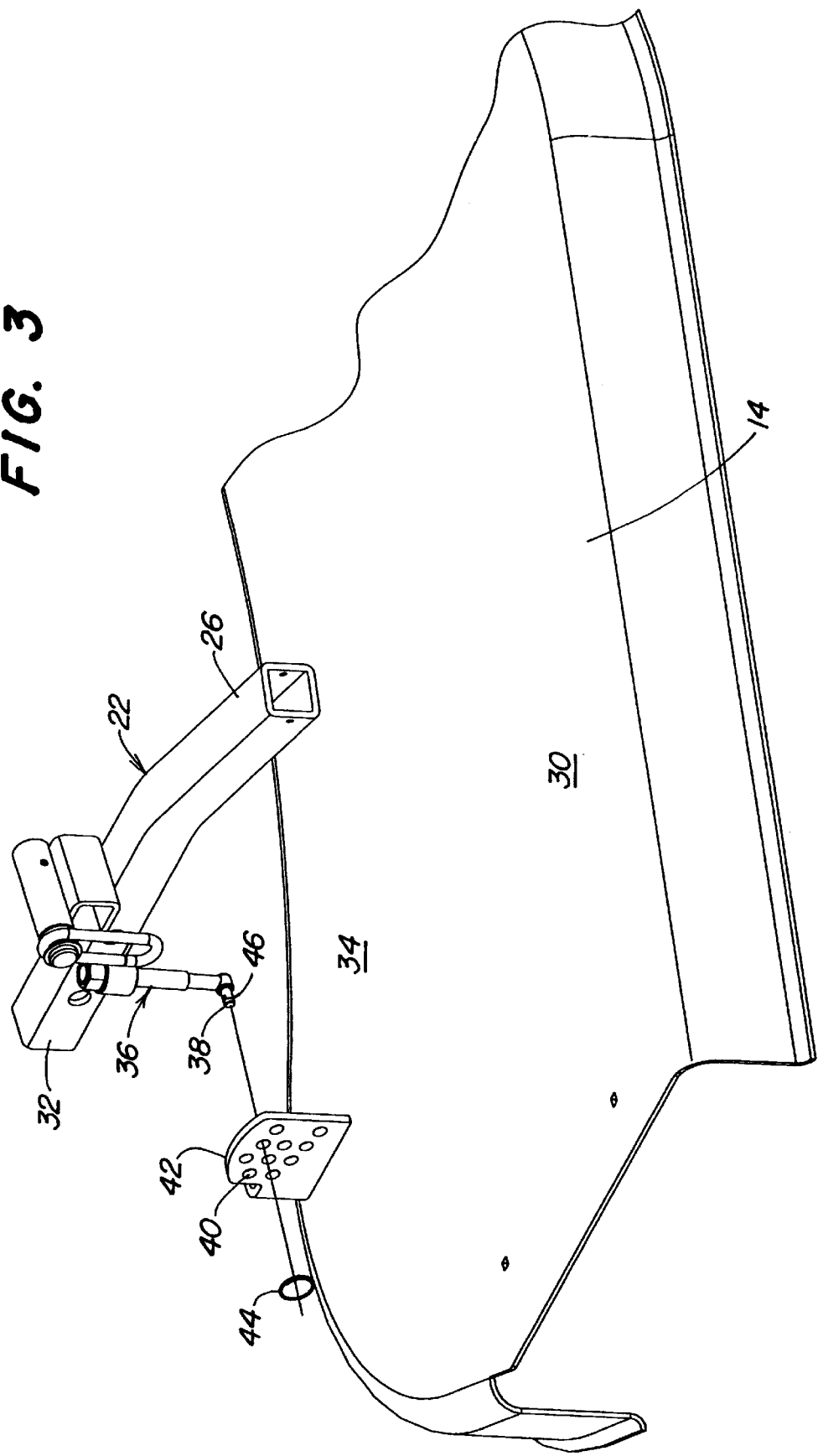
FIG. 3 is an exploded perspective partial view illustrating structure included in the rear adjustment means.

Looking first to FIGS. 1 and 2, there is shown a vegetation cutting device 10 having a drive portion 12 and a driven portion 14. The drive portion 12, preferably in the form of a tractor, is connected to the driven portion 14, constructed as a front-mounted cutting deck equipped with a pair of front scalp wheels 16 and a single adjustable rear scalp wheel 18. Extending between the tractor 12 and the deck 14 is a Power Take Off (PTO) 20 for driving the blade (not shown) of the cutting deck 14. A pair of lift arms 22, 24 are attached at their first end 26 to a weldment 28 located on a top-front portion 30 of the deck 14. The second ends 32 of arms 22, 24 are attached to rear portions 34 of the deck 14 by means of L-shaped as rigid links 36, see also FIG. 3, having lower legs 38 which can be received through round perforations 40 contained in upstanding members or front-to-rear levels 42. These levels 42 enable height adjustment of the rear portion 34 of the deck 14 relative to the top-front portion 30. The perforations 40 represent one-half inch increments of cut heighth. In FIG. 3, which illustrates a single arm 22 and level 42, the link 36 is secured to the upstanding member 42 by a fastener 44, in the form of a clasped O-ring, that can be inserted through an opening 46 in the link's lower leg 38.

Figure 4:
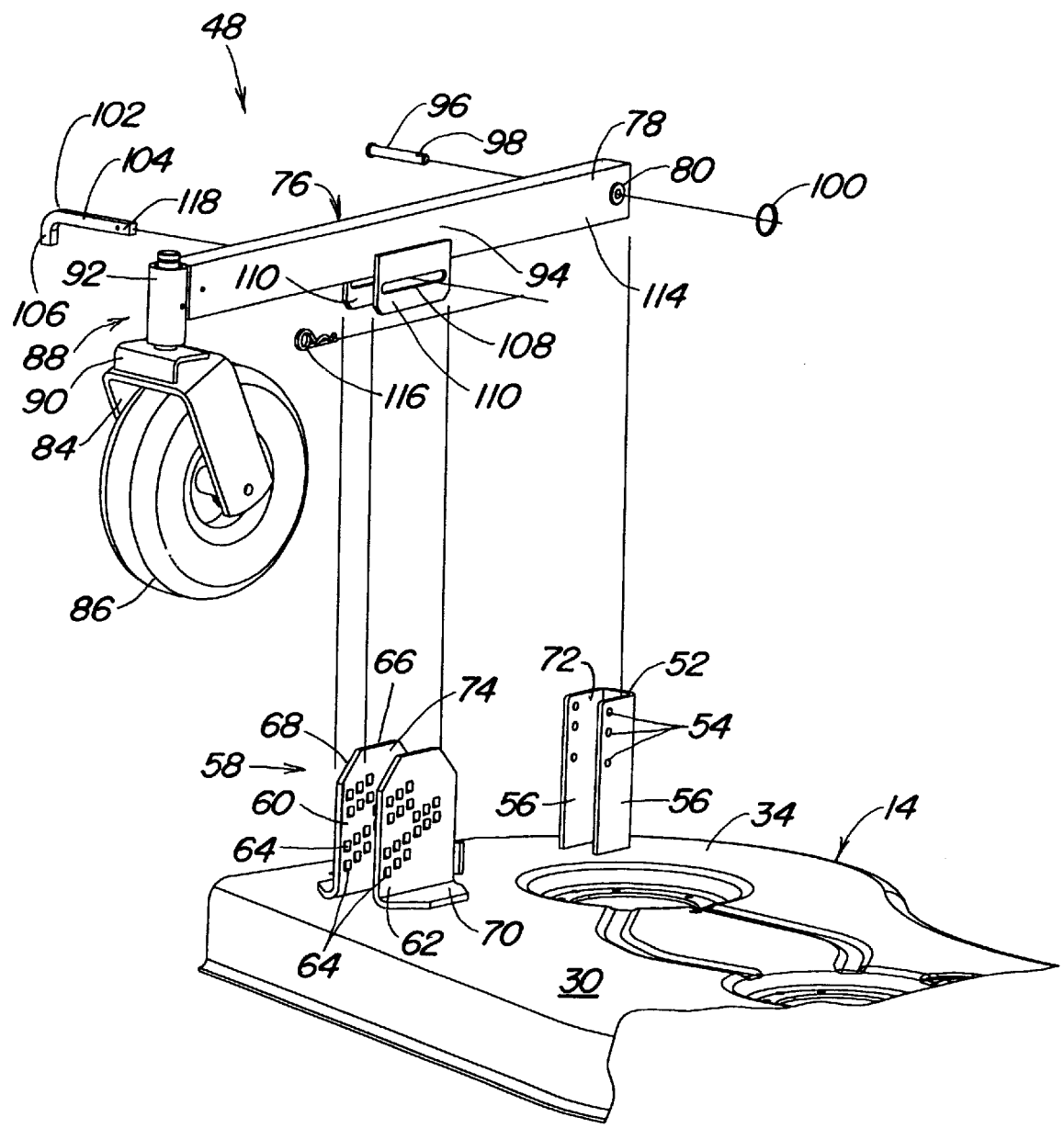
FIG. 4 is an exploded perspective partial view of the right adjustment means attachable to the deck.

Focusing now on FIGS. 2 and 4, the driven portion 14 includes right and left adjustment means 48, 50 for adjusting the front of the deck 14. Since the right and left adjustment means 48, 50 are mirror images, only the right adjustment means 48 will be discussed in detail. The means 48 consists of a U-shaped bracket 52 attached at the rear 34 of a top surface of the deck 14. Perforations 54 are provided in each side 56 of the bracket 52. Further provided is a mounting means 58 in the form of a bracing structure including preferably first and second upstanding plates 60, 62 spaced apart and having perforations 64 therethrough along with a flattened top profile or surface 66. The two sides 68 slope at a forty-five degree (45°) downward angle from the top 66 so as to allow branches or other vegetation to slide over and past the two sides 68. The bottom surface of each of the plates 60, 62 is constructed with a flanged portion 70 to enable attachment to the deck 14. When positioned upon the deck 14, the plates 60, 62 directly oppose each other such that the flanged portions 70 do not meet.

Figure 5:
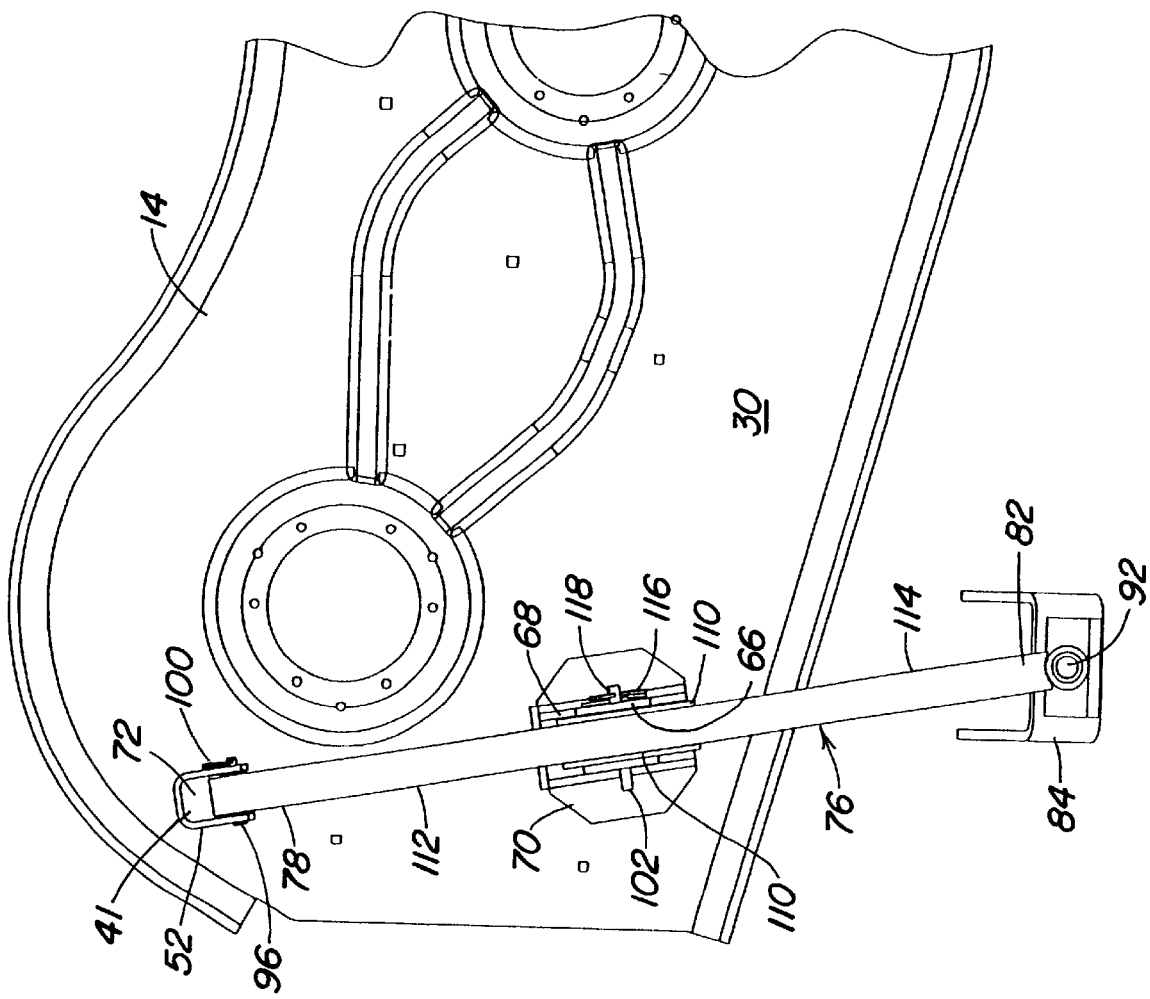
FIG. 5 is a partial plan view of the right adjustment means attached to a top surface of the deck.

As shown in FIGS. 4 and 5, positioned within inner channels 72, 74 of both the bracket 52 and mounting means 58, respectively, is a height positioning arm 76. The end 78 of the arm 76 has an aperture 80 therethrough. At a front end 82 thereof, the arm 76 has a guide bracket 84 to carry a gauge wheel 86. The gauge wheel 86 is connected to the arm 76 by a connection means 88 comprising, preferably, a bracket 90 having an attached spindle portion 92.

The arm 76 is secured at its rearwardly end 78 to the bracket 52 and at a mid-portion 94 to the mounting means 58. As seen in FIGS. 4 and 5, at the rear end 78 of the arm 76, a connector 96 constructed in the form of a pin having a receiving hole 98 passes through perforations 54 provided in the bracket 52 and into the aperture 80 within the arm 76. After having passed completely through the bracket 52, a second fastener 100 constructed as a clasped O-ring is introduced through the receiving hole 98 in the connector 96 to secure the arm 76 to the bracket 52. The mid-portion 94 of the arm 76 is secured to the mounting means 58 by a mounting pin 102 preferably having an L-shaped configuration consisting of upper and lower legs 104, 106. The pin 102 passes through the first plate 60 and through slots 108 contained in locating plates 110, attached on either side 112, 114 of the arm 76, for registering with perforations 64 provided in the mounting means 58. After passing through slots 108 and perforations 64 in second plate 62, the pin 102 is then secured by a retaining means 116 shaped as a spring locking pin passing through a bore 118 in the mounting pin 102. Having passed through the bore 118, the locking pin 116 then braces against the second plate 62 to hold the arm 76 in place.

Figure 6:
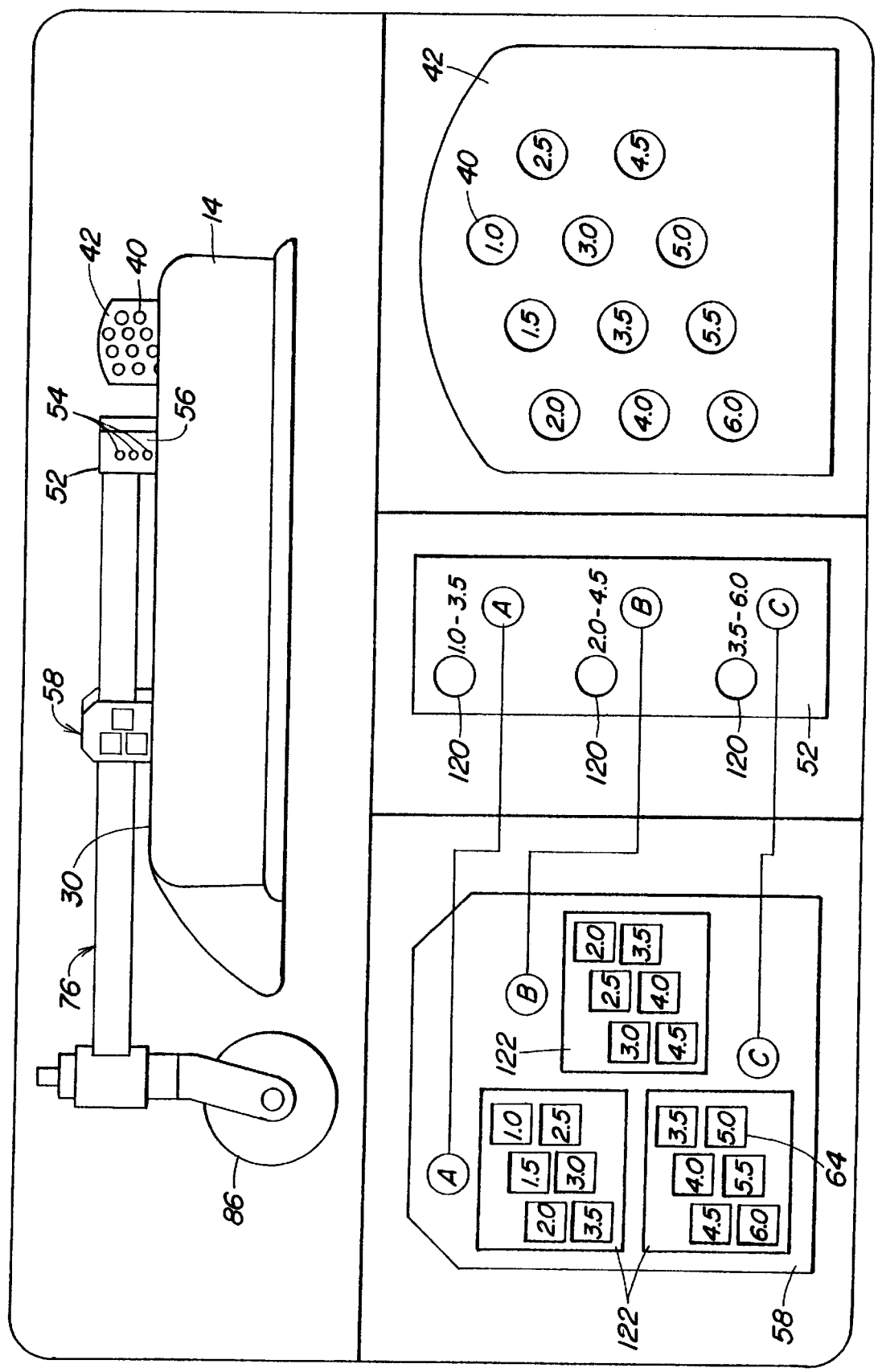
FIG. 6 is a schematic illustrating the structure of the front and rear adjustment means which enable a selection of cut heighth.
Figure 7:
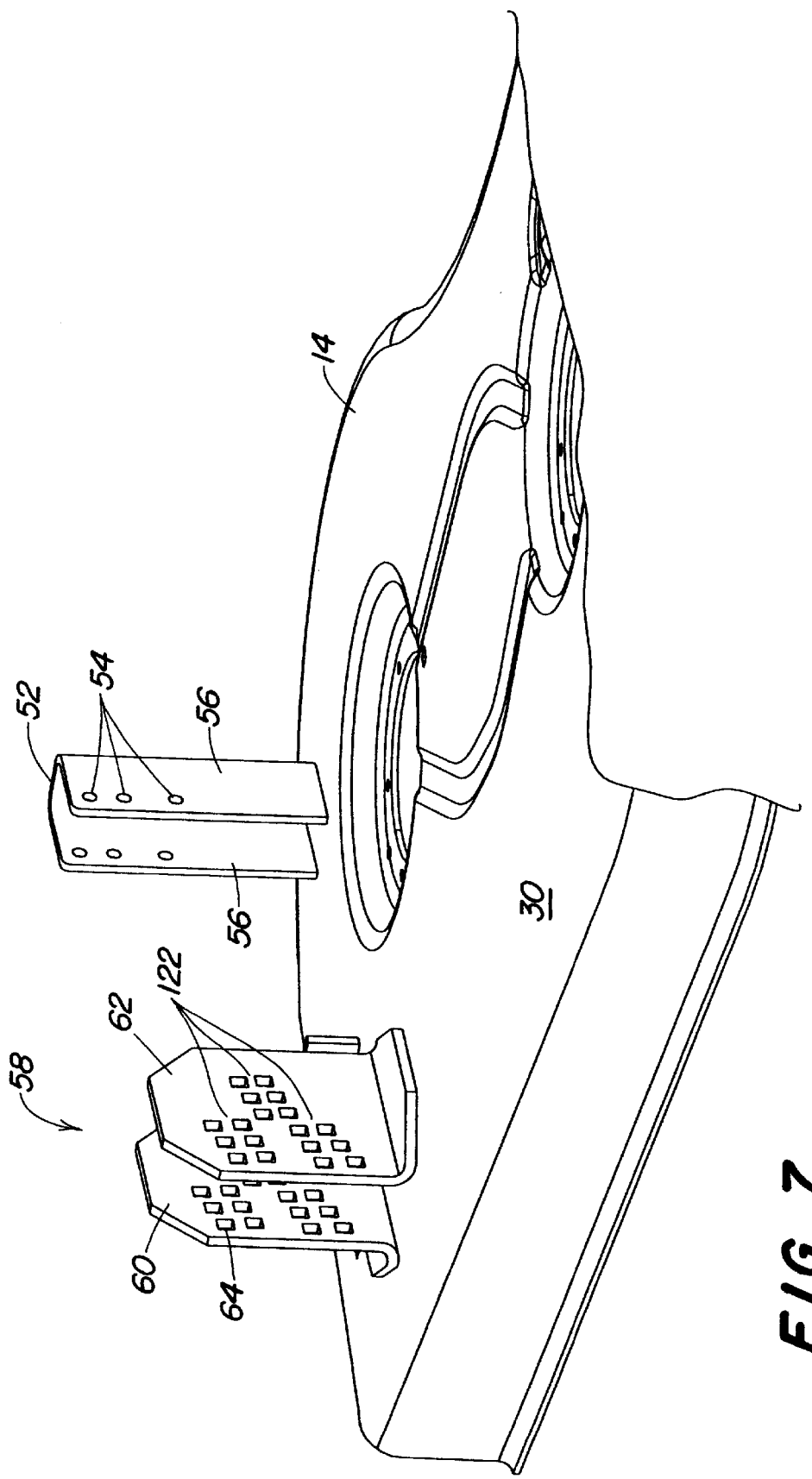
FIG. 7 is a perspective view of the bracket and mounting means of the front adjustment means.

Looking now to FIGS. 6 and 7, there is shown in detail the structure which provides for a range of cut heights from within which a particular height may be chosen. As can be seen in FIG. 6, both in the bracket 52 and mounting means 58, there is provided separate and easily distinguishable arrangements corresponding to selected cut heights ranging from one inch to six inches by one-half inch increments. U-shaped bracket 52 includes vertically spaced perforations 54. The perforations 54 in each side 56 are horizontally aligned to receive the connector 96 and provide three pairs 120 of settings. In the preferred embodiment, each horizontally aligned pair 120 designates height ranges corresponding to 1.0"–3.5", 2.0"–4.5", and 3.5"–6.0" from top to bottom, respectively. Other ranges can, of course, be provided as desired. Looking to FIG. 6, the mounting means 58 has three complimentary groupings or collections 122 of perforations 64 with range designations corresponding to those of the bracket 52. Each grouping 120 in the bracket 52 and the mounting means 58 cooperate together as a "set", as in "A", "B", or "C", as seen in FIG. 6, to provide a particular range within which a user may select upon the carrying out of grounds care. With this type of cooperation, as the arm 76 is mounted in a higher vertical "setting" among both the bracket 52 and mounting means 58, the arm will move away from the deck as the deck is adjusted to move toward the ground, and vice versa.

Insofar as the mounting means 58 is configured to enable the deck's height adjustment, the three arrangements 122 are provided which cooperate with the three provided arrangements 120 in the bracket 52 to allow the selection of a "corresponding" height range. The term "corresponding" denotes a relation of the same height range in both the bracket 52 and the mounting means 58. Each arrangement 122 of the mounting means 58 is constructed in the form of staggered or "stepped" rows and columns, as seen in FIG. 6. In each, two (2) rows and three (3) columns exist offering a selection of six (6) particular cut heights. In the three arrangements 122, at least two (2) of the six (6) cut heights within a single arrangement 122 are unique when compared to another of the remaining two arrangements. The other remaining selections provide an overlap consisting of the last highest choice(s) available in another of the particular arrangements 122. Such an overlap permits the user an ability to avoid disassembly should particular heights within the last highest range be desired to be selected. For example, while operating within the bracket's designated range of either 2.0" to 4.5" or 3.5" to 6.0", the user may select a cut height corresponding to 3.5", which is the last choice available from among the bracket's first provided range.

Thus, to obtain a uniform cut height, a preferred adjustment occurs when the rear of the deck is adjusted by changing the height of arm 22 relative to the deck 14 and placing the lower leg 38 (FIG. 3) of the link 36 through a desired height designating perforation 40, see also FIG. 6, of the level 42. After such placement has occurred, the link 36 is then secured to the level 42 by inserting the fastener 44 through the opening 46. Afterward, the user then begins adjustment of the front 30 of the deck 14 by selecting from among the provided arrangements 120,122 in both the bracket 52 and mounting means 58, respectively. Once a selection is made, the positioning arm 76 is then pinned in a desired perforation 54 in the bracket 52 and pivoted into the center of the two opposed plates 60, 62 of the mounting means 58. After being pivoted into position, the top surfaces of the bracket 52 and the mounting means 58 maintain a profile substantially at or below a top surface of the positioning arm 76 when a height selection falling within at least two of the groupings 122 has been chosen. The user will then locate the grouping 122 within one of the plates 60, 62 corresponding to the range previously selected in the bracket 52 and choose from among the particular height options offered therein. The mounting pin 102 is used to then select the perforation 64 of the mounting means 58 designating the desired cut height. Next, the pin 102 is inserted through the slots 108 contained within locating plates 110 which are registrable with the perforation 64. After having passed through the right plate 62, a retaining means 116 formed as the spring locking pin 116 is used to secure the pin 102 as it braces against the second plate 62.

In the present form of the invention, it is contemplated that the perforations 64 contained in the mounting means 58 be constructed of a square configuration compatible with the utilized mounting pin 102, which is also square in cross-section, to prevent against slippage, rotation and/or looseness once fastened. Also, it is preferred that each of the bracket 52, mounting means 58, and the positioning arm 76 be constructed of steel, assuring the strength of the adjustment means.

Further, as seen in FIG. 2, the anti-scalp wheel 18 is to be mounted to a rear corner of the deck 14 which, after having adjusted the deck 14 to a uniform cut height, the user may position at a desirable increment above the ground. Adjustment of the height of the scalp wheel 18, relative to the deck 14, may be obtained by visual inspection as to how high an increment is necessary, wherein height selections are provided in increasing one-half inch increments.

With the instant invention, there is provided an easily manipulated cutting height adjustment mechanism allowing the user to position the deck of the vegetation cutting implement under low hanging vegetation and shrubbery. A still further advantage of the present invention is an ability to quickly determine, by visual inspection, the selected range of cut height. From among these advantages, the user is enabled to reduce the amount of time and effort necessary to obtain the completion of either personal and/or professional grounds-care maintenance.

While the present invention has been described in conjunction with a specific embodiment, it is understood that many alternatives, modifications, and variations will be apparent to those skilled in the art in light of the foregoing description. Accordingly, this invention is intended to embrace all such alternatives, modifications and variations which fall within the spirit and scope of the appended claims.

We claim:

1. An adjustment mechanism for setting the cut height of a deck of a vegetation cutting device, the mechanism comprising:
   a) a first bracket attached to the deck;
   b) a plurality of vertically spaced openings provided in the first bracket;
   c) a mounting means attached to the deck and spaced from the first bracket;
   d) a plurality of groups of openings provided in the mounting means with each group corresponding to one of the vertically spaced openings in the first bracket;
   e) a positioning arm having first and second end portions and an intermediate portion;
   f) means for releasably pivotally connecting the first end portion of the positioning arm with any selected one of the vertically spaced openings provided in the first bracket;
   g) means for releasably fastening the intermediate portion of the positioning arm with any selected one of the openings of the corresponding groups of openings in the mounting means;
   h) a second bracket joined to the second end portion of the arm; and
   i) a ground engaging wheel rotatably carried by the second bracket, whereby changing the opening within the corresponding groups of openings with which the intermediate portion of the positioning arm is fastened changes the vertical angular orientation of the positioning arm with respect to the deck, and hence the cut height of the deck and, each opening in the first bracket corresponding with one of the groups of openings in the mounting means to provide different ranges of deck cut heights, the groups of openings being spaced from one another and at least one of the groups being at least laterally offset from at least another of the groups so as to enable association of the lowest to highest range of cut height among the groups.

2. The mechanism as recited in claim 1, wherein the mounting means is arranged intermediate the first and second bracket.

3. The mechanism as recited in claim 1, wherein the mounting means further includes at least one upstanding portion.

4. The mechanism as recited in claim 1, wherein the mounting means includes a pair of upstanding portions.

5. The mechanism as recited in claim 3, wherein the at least one upstanding portion includes an angled portion adapted to attach to the deck.

6. The mechanism as recited in claim 4, wherein each of the pair of upstanding portion includes an angled portion adapted to attach to the deck.

7. The mechanism as recited in claim 1, wherein the groups of openings occur in a row and column configuration.

8. The mechanism as recited in claim 7 wherein the groups of openings occur in at least three row and column configurations.

9. The mechanism as recited in claim 1, wherein the positioning arm carries a locating plate on a side surface thereof.

10. A The mechanism as recited in claim 9, wherein the locating plate includes a slot registrable with at least one of the openings of the mounting means.

11. The mechanism as recited in claim 1, wherein the means for fastening includes a pin and clasp.

12. The mechanism as recited in claim 11, wherein the pin has a hole through which the clasp extends.

13. The mechanism as recited in claim 1, wherein the openings of the mounting means are configured as square holes.

14. A vegetation cutting device, comprising:
   a) a drive portion; and,
   b) a driven portion including
      1. a deck;
      2. first and second front adjusting means, each attached on opposite sides of a top surface of the deck;
      3. first and second positioning arms supported and carried by the first and second front adjusting means, respectively, and each arm having a bracket attached to one end and a wheel carried by the bracket for enabling the deck to be supported above the ground once the arms have been associated with their respective adjusting means;

4. a plurality of groups of cut height openings disposed in the first and second front adjusting means which cooperate to provide overlapping ranges of cut height within which the arms may be adjusted, the groups of openings being spaced from one another and at least one of the groups being at least laterally offset from at least another of the groups so as to enable association of the lowest to highest range of cut height among the groups;

5. means for fastening each positioning arm with one of the openings in the first and second front adjusting means;

6. first and second laterally spaced lift arms attached to the deck and the drive portion; and, 7. first and second rear adjusting means attached to the deck and the rear lift arms.

15. The device as recited in claim 14, wherein the first and second rear adjusting means cooperate together with the first and second front adjusting means to provide a uniform cut height of the deck.

16. The device as recited in claim 14, wherein each of the first and second front adjusting means includes a bracket and at least one upstanding portion spaced apart from each other.

17. The device as recited in claim 14, wherein each of the first and second front adjusting means includes a height adjustment bracket having pairs of aligned openings, a pair of separate upstanding portions containing the plurality of groups of cut height openings, the height adjustment bracket being spaced apart from the upstanding portions, and the pairs and groups of openings cooperating to provide sets of ranges of cut height.

18. The device as recited in claim 17, wherein the positioning arm is disposed between the height adjustment bracket and the pair of upstanding portions.

19. The device as recited in claim 14, wherein the first and second front adjusting means include an angled portion assisting in the attachment thereof to the deck.

20. The device as recited in claim 17, wherein the openings are provided on opposite sides of the bracket and opposite sides of each of the pair of upstanding portions.

21. The device as recited in claim 14, wherein the positioning arm carries a locating plate on each of the two side surfaces thereof.

22. The device as recited in claim 21, wherein the locating plate has a slot registrable with at least one of the openings of the groups of openings.

23. The device as recited in claim 14, wherein the means for fastening includes two pins and two clasps.

24. The device as recited in claim 23, wherein each of the front adjusting means includes a bracket and a mounting means having a pair of upstanding portions, each arm carrying a locating plate on a first portion and including an aperture in a second portion thereof, the pins and clasps being associated with the arm and the locating plate to secure the arm to each of the bracket and mounting means.

25. The device as recited in claim 24, wherein the pins have holes through which the clasps extend.

26. The device as recited in claim 25, wherein after having passed completely through the height adjustment bracket and mounting means, the pins are clasped at exterior surfaces thereof.

27. The device as recited in claim 16, wherein the positioning arm is arranged for pivotal movement about an axis which is substantially transverse to a longitudinal axis of the positioning arm and which passes through the bracket.

28. The device as recited in claim 14, wherein the first and second rear adjusting means are attached to a top surface of the deck.

29. The device as recited in claim 14, wherein the first and second rear adjusting means include a vertical portion connectable with the lift arms.

30. The device as recited in claim 29, wherein the vertical portion includes a series of perforations.

31. The device as recited in claim 30, wherein the perforations represent one-half inch increments of cut height.

32. The device as recited in claim 14, wherein the driven portion attaches to a front side of the drive portion.

33. The device as recited in claim 14, wherein the driven portion includes a pair of guide wheels affixed to an edge thereof.

34. The mechanism as recited in claim 14, wherein the openings are configured as square holes.

35. An adjustment mechanism for setting the cut height of a deck of a vegetation cutting device, the mechanism comprising:

a) a bracket attachable to the deck and having a plurality of openings;

b) a mounting means spaced apart from the bracket and adapted to be attached to the deck and which includes separate groups of openings therein;

c) an elongated gauge wheel arm releasably securable to the bracket and the mounting means, the arm having opposite end portions with one end portion adapted to be pivotally attached to one of the openings of the bracket and the arm being supported and carried by the bracket and the mounting means;

d) a wheel adapted to be carried on the other end portion of the arm;

e) means for adjustably and releasably securing the arm with each of the bracket and the mounting means, wherein the openings of the bracket and the separate groups of openings in the mounting means are arranged to correspond to each other to provide ranges of matching cut heights for the deck, each of the separate groups of openings in the mounting means further providing an overlap in the cut height to which the deck may be adjusted, the groups of openings being spaced from one another and at least one of the groups being at least laterally offset from at least another of the groups so as to enable association of the lowest to highest range of cut height among the groups.

36. The mechanism as recited in claim 35, wherein the arm includes an upper surface and the bracket and mounting means are adapted to be connected to the arm substantially at or below the upper surface.

* * * * *